United States Patent
Westbury et al.

(10) Patent No.: US 6,873,963 B1
(45) Date of Patent: Mar. 29, 2005

(54) SHIPMENT TRACKING ANALYSIS AND REPORTING SYSTEM (STARS)

(75) Inventors: Leslie M Westbury, Windsor (CA); Cary J Koob, Mount Clemens, MI (US); Robert S Hamilton, Orangeville (CA); Larry R Proodian, Novi, MI (US); Linda C Stinson-Alcini, West Bloomfield, MI (US); Michael P Noon, Woodhaven, MI (US); Robert M Allison, Clarkston, MI (US); Douglas S Kalemba, Oak Park, MI (US); Annamalai Kailainathan, Troy, MI (US); Thyagarajan Palani, Mumbai (IN)

(73) Assignee: DaimlerChrysler Corporation, Auburn Hills, MI (US)

( * ) Notice: Subject to any disclaimer, the term of this patent is extended or adjusted under 35 U.S.C. 154(b) by 663 days.

(21) Appl. No.: 09/451,332

(22) Filed: Nov. 30, 1999

(51) Int. Cl.$^7$ .............................................. G06F 17/60
(52) U.S. Cl. ......................................................... 705/8
(58) Field of Search .............................. 705/8; 700/115; 701/204

(56) References Cited

U.S. PATENT DOCUMENTS

| | | | |
|---|---|---|---|
| 4,240,079 A | | 12/1980 | Zhilin |
| 5,739,787 A | | 4/1998 | Burke et al. |
| 5,835,377 A | * | 11/1998 | Bush ............................ 700/99 |
| 5,902,351 A | | 5/1999 | Streit et al. |
| 5,940,835 A | | 8/1999 | Sit |
| 5,978,771 A | * | 11/1999 | Vandivier, III ................ 700/99 |
| 6,148,291 A | * | 11/2000 | Radican ........................ 705/22 |
| 6,182,053 B1 | * | 1/2001 | Rauber et al. ............... 235/375 |

FOREIGN PATENT DOCUMENTS

JP          411139540 A   *  5/1999   ............ B65G/43/08

OTHER PUBLICATIONS

Dysart, Joe. "Making Inroads with On–Board Computers." Distribution. vol. 93, No. 3, p. 45, Mar. 1994.*
Anonymous. "Tracking Freight on the Internet." Transportation & Distribution. vol. 37, No. 10, p. 98, Oct. 1996.*
Anonymous. "Amtech to Install Hands–Free AEI System for Dillard's." Fleet Equipment. Transport Technology Today Supplement, p. S18, Jul. 1996.*
Williams, Lisa R. & Kant Rao. "Information Technology Adoption: Using Classical Adoption Models to Predict AEI Software Implementation." Journal of Business Logistics. vol. 18, No. 2, pp. 43–54, 1997.*
Anonymous. "Con–Way NOW Enters the Expedited Market." Transportation & Distribution. vol. 37, No. 11, p. 74, Nov. 1996.*

(Continued)

Primary Examiner—Susanna M. Diaz
(74) Attorney, Agent, or Firm—Ralph E. Smith

(57) ABSTRACT

The present invention provides a method for tracking material being transferred from a source to a destination by a carrier which comprises the steps of receiving a transmission from the source, the transmission being indicative of characteristics of the material. Also, a second transmission indicative of characteristics of the carrier is received. The carrier information is then associated with the supplier information. In another aspect, this information is used to estimate times for arrival of shipments, generate alarms for late arrivals and measure performance of suppliers and carriers.

7 Claims, 3 Drawing Sheets

OTHER PUBLICATIONS

"U.S.–Mexico Border Cargo Undergoes Electronic Monitoring." San Antonio Express–News, p. N/A, Sep. 2, 1997.*

Kellner, Mark A. "Travels with My CoPilot." PC Portables Magazine. vol. 9, No. 11, p. 18, Nov. 1997.*

Schoeneman, J.L. "Authenticated Tracking and Monitoring System Tracking Shipments from an Australian Uranium Mine." USDOE. Report No. SAND–98–1767C, Dec. 31, 1998.*

"Con–way NOW Expands into Southwest." Business Wire. Aug. 26, 1999.*

Dilger, Karen Abramic. "The Best Way to Get it There." Manufacturing Systems. vol. 15, No. 4, pp. 86–90, Apr. 1997.*

Hawkes, Peter. "Supertag—Stock Counting Off Its Trolley." Sensor Review. vol. 14, No. 3, pp. 23–25, 1994.*

Jacobs, Jon. "Manufacturing: Making it Just in Time." International Business. vol. 5, No. 10, p. 52, Oct. 1992.*

Mukhopadhyay, Tridas et al. "Business Value of Information Technology." MIS Quarterly. vol. 19, No. 2, p. 137, Jun. 1995.*

Karpinski, Richard. "Web Supply Chains Revised." InternetWeek, p. 1, Oct. 1, 2001.*

Aichlmayr, Mary & Mike Freeze. "The Quest for Excellence Never Ends." Transportation & Distribution. vol. 41, No. 5, pp. 29–34, May 2000.*

* cited by examiner

SHIPMENT TRACKING ANALYSIS AND REPORTING SYSTEM (STARS)

FIELD OF THE INVENTION

The present invention relates to a tracking system for material, and more particularly, a tracking system for material which associates supplier information with carrier information.

BACKGROUND OF THE INVENTION

Present manufacturers are subject to a competitive drive to reduce manufacturing cost. This cost, in part, is dependent upon lead time and inventory reduction. Lead time is the time requirement, from time of ordering, to ship a product to the customer. Large lead times increase the amount of time a manufacturer's product is with the manufacturer. This, in turn, reduces the amount of sales a company receives per unit time resulting in increased overall manufacturing cost.

Inventory is basically the amount of material or components, otherwise known as supplier goods, which a manufacturer retains on-hand for manufacturing purposes. Retaining a large inventory increases carrying cost which results in an overall increase in manufacturing cost. However, large inventories ensure that a manufacturer retains enough supplier goods for assembly. Contrarily, if a manufacturer does not have sufficient goods for assembly, the manufacturer may be forced to sit idle while awaiting a shipment from a supplier. This also results in an increase in lead time and manufacturing cost. A very common situation where a manufacturer is forced to sit idle occurs where a shipment of supplier goods is late in arriving to the manufacturer. To protect themselves from this situation, manufacturers typically retain a certain amount of buffer inventory to keep from running out of supplier goods. This buffer inventory is a predetermined amount of supplier goods above and beyond what the manufacturer actually needs during normal supplier delivery times. A manufacturer is, therefore, ensured that if a supplier shipment is late, the manufacturer can use the buffer inventory while awaiting supplier shipment. However, as discussed above, this buffer inventory increases inventory and corresponding manufacturing costs.

By accurately predicting the time which supplier goods are to arrive at the manufacturer, the buffer inventory and corresponding manufacturing costs can be reduced. As such, manufacturers have devised various material tracking systems to track supplier goods. More specifically, manufacturers have devised ways to track when shipments are to be delivered and the amount of and type of supplier goods which are contained in those shipments.

Suppliers issue a form to the manufacturer having supplier information. This supplier information usually includes the time and date of when material departed the supplier location. This information also usually includes the quantity and type of material being delivered. Manufacturers use this information to predict supplier delivery times by using the date and time of departure provided with the supplier information and combine it with a general knowledge of the time required to transport it from the supplier to the manufacturer. This combination is then used to determine an estimate of when the material is to arrive at the manufacturer.

While this method does provide an estimated time for receipt of material, the estimate provided is not very accurate. Typically, the date and time which the supplier lists on the supplier form is not the same date and time that the material actually leaves the supplier. This inaccuracy is sometimes due to suppliers not having accurate information relating to the actual departure times of the supplier goods. If a manufacturer uses this inaccurate information to estimate a time for arrival, the estimated time will be earlier than the actual time for arrival. As a result, manufacturers are then forced to rely on the buffer inventory to continue production. This results in manufacturers being required to, once again, carry an increased buffer inventory.

However, the carrier who transports the supplier goods provides information to the manufacturer which usually has accurate information relating to the actual time of departure. More specifically, the carrier who delivers the supplier goods issues a document to the manufacturer containing certain carrier information. This carrier information includes the source, destination and actual time the supplier goods depart the supplier. However, the carrier information usually does not include information specifically relating to the particular goods which the carrier is delivering. As such, the manufacturer can only determine that a shipment is departing from a supplier on a specific day and not what supplier goods are contained within the shipment from this information.

Accordingly, there exists a need in the relevant art to provide a method for associating the carrier information with the supplier information to obtain an accurate estimate of when supplier goods are to reach the manufacturer.

SUMMARY OF THE INVENTION

In view of the above, it is an object of the present invention to provide a method for associating carrier information with supplier information to obtain accurate time estimates of delivery from a supplier to a manufacturer.

Still another object of the present invention is to provide a method for associating carrier information with supplier information to generate an alarm code for potential late shipments.

Yet another object of the present invention is to provide performance measurements based upon a method for associating carrier information with supplier information and route plan.

In accordance with the broad teachings of this invention, a method for tracking material being transferred from a source to a destination by a carrier comprises the steps of receiving a transmission from the source, the transmission being indicative of characteristics of the material. Also, a second transmission indicative of characteristics of the carrier is received. The carrier information is then associated with the supplier information. In another aspect, this information is used to provide estimated arrival times for interested parties, generate alarms for late arrivals and measure performance of suppliers, carriers and other elements.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
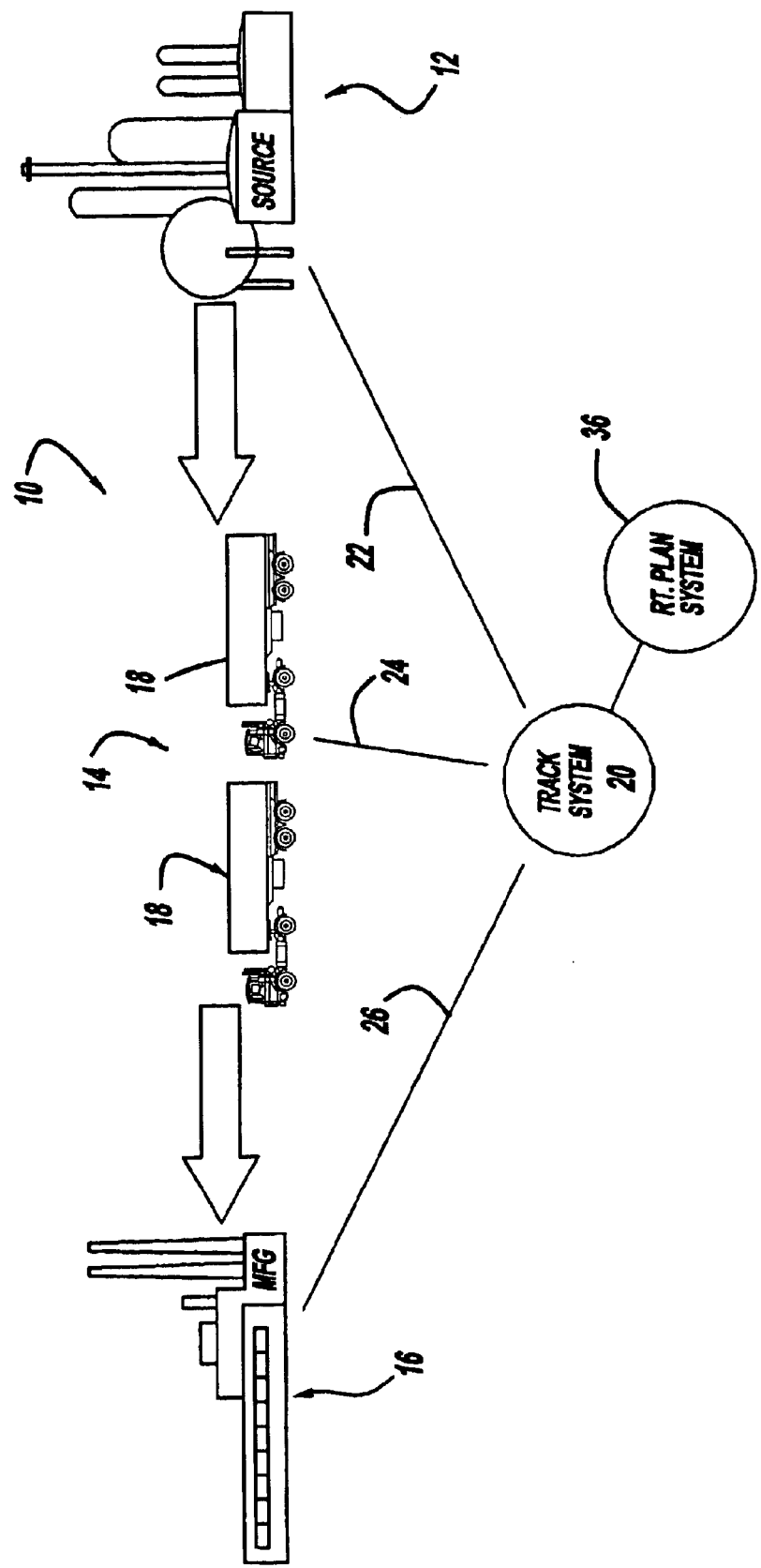
FIG. 1 is a schematic view of a material tracking system according to the present invention.

FIG. 1 illustrates a schematic view of a material tracking system 10 according to a first embodiment of the present invention. Material tracking system 10 generally includes supplier 12, carrier 14, and manufacturer 16. Supplier 12 is a typical producer of components or raw material, hereinafter known as supplier goods, for use by manufacturer 16 to construct a final product. Such raw material or components could include, but are not limited to, iron ore for steel plants, accessories for automobile manufacturers or other typical supplier goods as is known in the art. However, supplier 12 could also include an intermediate location (as will be discussed) or the distributor of final components from a manufacturer. Such distributors of final components would include the shipment of a final product, such as an assembled automobile, to a sales location such as a dealer lot. Carrier 14 is a shipping company which employs specific shipping units 18 to move the supplier goods from one location to another. Shipping units 18, although illustrated as trucks, can be any type of shipping vehicle including, but not limited to, planes, trains, water craft, or trucks. Manufacturer 16 is a manufacturer or producer of final components (as is known in the art) such as, but not limited to, an automobile manufacturer, steel producer, or other industrial platform.

Tracking system 20 is a computer, group of manufacturing personnel, or other medium designed to track the flow of supplier goods from supplier 12 to manufacturer 16. To communicate with supplier 12, carrier 14 and manufacturer 16, tracking system 20 uses supplier communicative link 22, carrier communicative link 24, and manufacturer communicative link 26. Each link 22, 24, and 26 provides conduits for specific information to be transferred from supplier 12, carrier 14, and manufacturer 16 respectively which tracking system 20 then uses to track the flow of supplier goods being delivered from supplier 12 to manufacturer 16.

Manufacturer 16 provides a need time through communicative link 26 to tracking system 20. This need time specifies a time and date when manufacturer 16 must receive supplier goods from supplier 12.

Route plan system 36 communicates with tracking system 20 to provide specific time-in-route estimating for various shipping routes to and from manufacturer 16. More specifically, route plan system 36 is a database which stores the required driving, sea, or flying time (depending on the mode of shipping) to transport supplier goods from a specific supplier 12 to a specific destination such as manufacturer 16. Route plan system 36 also has stored specific time-in-route times to travel from an intermediate location (as will be discussed) to a specific destination (which might be another intermediate location).

With continued reference to FIG. 1, a first embodiment of the present invention is described. In this embodiment of the present invention, supplier 12 provides a transmission to manufacturer 16, in the form of an electronic document referred to as commodity information, which contains certain characteristics of the supplier goods being delivered to manufacturer 16. Preferably, this information includes the part number of the supplier goods, quantity of supplier goods, supplier code of supplier 12, the ultimate destination of the supplier goods, departure date and time of the supplier goods from supplier 12, and an arbitrary and unique package number assigned to each shipment which the supplier goods reside in. This commodity information is supplied to tracking system 20 through communication link 22.

Typically, the shipping date and time provided in the commodity information is different than the actual date and time which supplier 12 ships the raw material, thereby creating a discrepancy between the two date and times. As such, if tracking system 20 estimates the time which shipping units 18 supply goods to manufacturer 16 from the commodity information, the determined ETA would be different than the actual delivery date. If the actual delivery falls after this ETA, manufacturer 16 may be sitting idle, not producing, and awaiting supplier goods from supplier 12. Likewise, if the ETA is later than the actual delivery, the manufacturer might spend money to expedite supplier goods and thereby unnecessarily absorb costs to expedite supplier goods from the supplier 12.

When shipping units 18 initially pick up the supplier goods from supplier 12, carrier 14 issues an electronic document to tracking system 20. This document, otherwise referred to as a carrier shipment notification form, is indicative of certain characteristics of the carrier 14 and is transmitted to tracking system 20 through communication link 24. The characteristics contained within the carrier shipment notification form include information specifically relating to carrier 14 such as departure and arrival times. More specifically, these characteristics include the conveyance number of each shipping unit 18 which carries the supplier goods, the pick up location of the supplier goods (i.e. supplier 12), the delivery location of the material (i.e. manufacturer 16), SCAC codes (standard carrier alpha code) which uniquely indicates the specific carrier 14, and the date and time which carrier 14 actually picked up the supplier goods. Contrary to the commodity information, the carrier shipment notification does not contain information relating to the supplier goods as discussed previously. As such, from the carrier shipment notification alone, one cannot determine the specific supplier goods being shipped.

Two important features exist regarding the carrier shipment notification. First, the carrier shipment notification contains an estimated time for arrival of when carrier 14 will reach its destination. This ETA is accurate since it is being given by the entity which is actually delivering the supplier goods. However, since the carrier shipment notification does not contain specific supplier information, it does not contain an estimated time for arrival of specific supplier goods. Instead, it only contains the ETA of the carrier unit itself. Second, the carrier shipment notification is issued by the carrier at various points along the carrier's journey. For instance, when carrier 14 initially picks up the supplier goods from supplier 12, a carrier shipment notification is issued. Likewise, if the carrier 14 encounters delays, traffic jams or other events which modify the time at which carrier 14 will deliver the supplier goods, carrier 14 will issue another carrier shipment notification updating the present situation with a new time of arrival.

From the previous discussion, it is understood that one cannot determine an accurate ETA of specific supplier goods from the commodity information or carrier shipment notification alone. As such, one must combine both the carrier shipment notification and the commodity information to arrive at an accurate date and time of shipment for specific supplier goods. However, due to the vast number of suppliers and carriers, it can be difficult to associate one specific set of commodity information with one specific carrier shipment notification. The present invention, therefore, is designed to identify corresponding commodity information and carrier shipment notification and combine these two sources of information to obtain one source. This one source has the specific supplier goods from the supplier information and has the accurate ETA obtained from the carrier shipment notification.

To obtain this one source of information, tracking system 20 loads the information provided by all commodity information and all the carrier shipment notifications into a standard database. Tracking system 20 then compares the information provided by each set of commodity information to that provided by each carrier shipment notification form. This comparison is designed to associate a specific commodity information with a corresponding carrier shipment notification. More specifically, tracking system 20 associates the supplier goods with the carrier which is actually delivering the supplier goods to manufacturer 16 to correlate the shipping date and time listed in the carrier shipment notification to the supplier goods as listed in the commodity information. To accomplish this association, tracking system 20 compares the pick up location, such as a ship-from listed on the commodity information to the pick up location of supplier goods listed in the carrier shipment notification, the delivery location listed in the commodity information to the delivery location listed in the carrier shipment notification, compares the conveyance SCAC (standard carrier alpha code) in the commodity information to that listed in the carrier shipment notification, compares the conveyance number in the carrier shipment notification to that in the conveyance SCAC, and compares the shipping date and time listed in the commodity information to the shipping date and time listed in the carrier shipment notification form. The more similarities found between these items increases the probability that specific commodity information is associated with a specific carrier shipment notification. By this way, all the information contained within specific commodity information can be combined with all the information contained within a carrier shipment notification to generate one accurate piece of information, hereinafter referred to as the supply shipment report, containing accurate information about specific supplier goods. The tracking system can match one or all of these criteria to obtain a match.

Once a supply shipment report is created, tracking system 20 determines the best ETA, either by 1) combining the time-in-route information from route plan system with the departure date and time in the supply shipment report, or by 2) using the carrier ETA, or by 3) using the schedule information in the route plan system.

Preferably, the above discussed supply shipment report is enhanced with further information provided by the manufacturer 16, via manufacturing communication link 26, which includes a need time. This need time indicates when manufacturer 16 must receive supplier goods from supplier 12 in order to continue production, or more particularly, when a manufacturer will exhaust its normal inventory and then be required to begin using its buffer inventory. Tracking system 20 compares this need time with its determined estimated time for arrival of the supplier goods. From this, tracking system 20 determines whether the supplier goods will be delivered to manufacturer 16 on time. If tracking system 20 then determines that the supplier goods will be delivered later than the need time requires, a user or operator can be apprised of this in advance by an alarm or other means and then can make alternate arrangements to ensure that manufacturer 16 has a sufficient supply of supplier goods. If earlier, than the manufacturer can also make an appropriate response to reduce costs.

Figure 2:
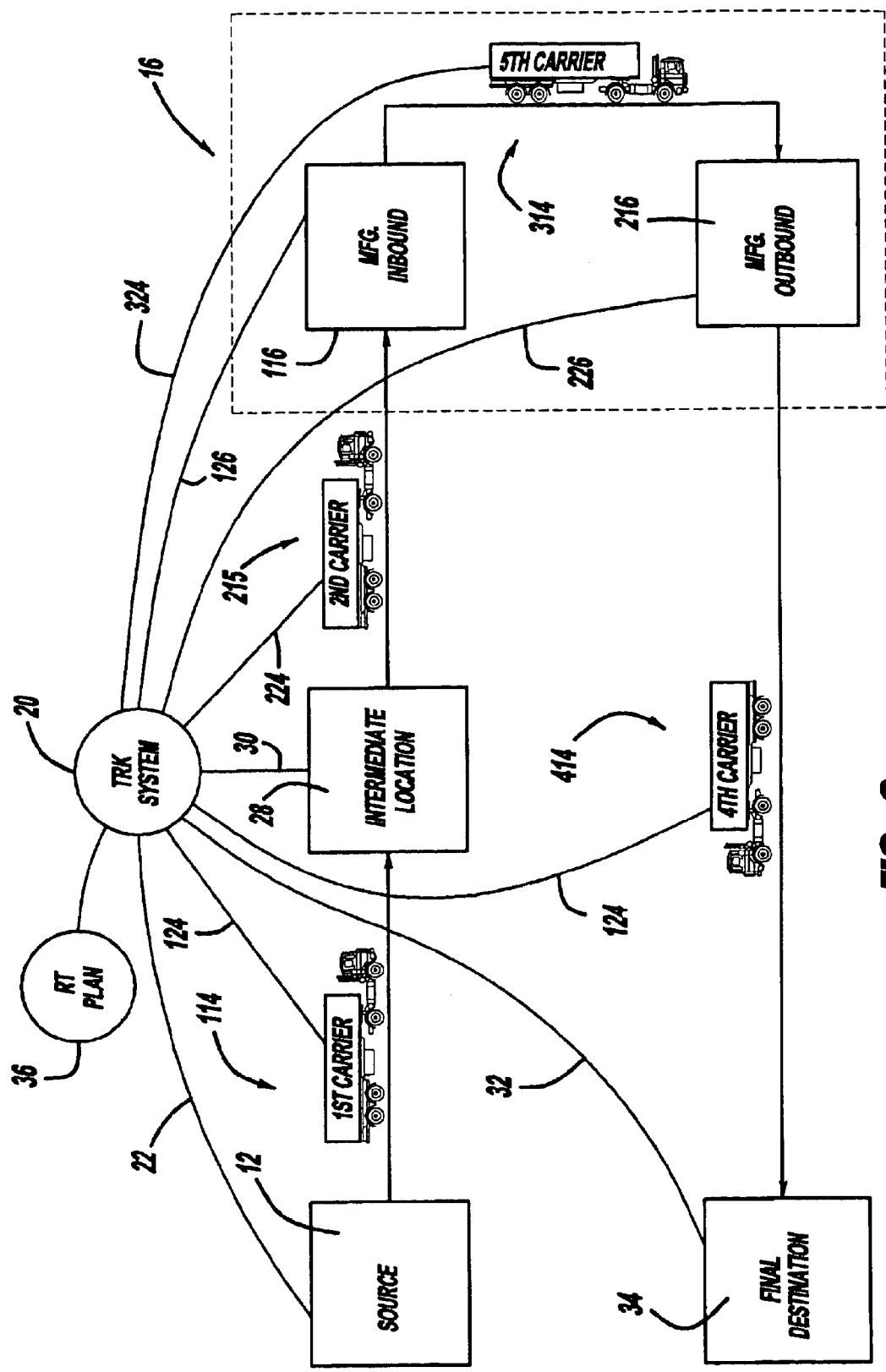
FIG. 2 is a schematic view of a second embodiment of a material tracking system according to the present invention.

Referring now to FIG. 2, a second embodiment of the present invention is shown and described. The embodiment depicted in FIG. 2 includes an intermediate location 28, manufacturer inbound 116, manufacturer outbound 216, and final destination 34. First carrier 114, second carrier 215, third carrier 314, and fourth carrier 414 provide shipping between each of these respective units. More specifically, first carrier 114 delivers supplier goods from supplier 12 to intermediate location 28. Second carrier 215 moves this material from intermediate location 28 to manufacturer inbound 116. From here, the manufacturer processes the supplier goods and moves it internally with third carrier 314 to manufacturer outbound 216. The final product is delivered by fourth carrier 414 from manufacturer outbound 216 to final destination 34.

Intermediate location 28 acts, in many respects, similar to supplier 12. Intermediate location 28 issues information, otherwise known as commodity information B, to tracking system 20 upon shipment of the supplier goods. This information includes departure date and time from intermediate location 28 and also includes specific carrier information, which is contained in the carrier shipment notification form issued by carrier 215. By virtue of the first embodiment of the present invention, the commodity information A can be associated to the carrier shipment notification and commodity information B to provide one supply shipment report which gives information contained in both the commodity information A and commodity information B. As a result, tracking system 20 has detailed information regarding the supplier goods, carrier 215 and date and time of departure of supplier goods from intermediate location 28.

Upon departure with the supplier goods from intermediate location 28, carrier 215 issues a second carrier shipment notification form to tracking system 20. This second carrier shipment notification provides carrier information including the actual date and time of departure from intermediate location 28. Like supplier 12 and its accompanying commodity information A, the date and time of departure provided by intermediate location via the commodity information B sometimes differs from the actual departure date and time listed in this second carrier shipment notification. Most importantly, the departure date and time contained in this second carrier shipment notification is typically more accurate than that provided by the commodity information B. The reasons for this inconsistency are the same as for supplier 12 and carrier 14 in the first embodiment. Also like the first embodiment, the information provided by carrier 215 does not contain information regarding the actual supplier goods as known by intermediate location 28 and listed in the commodity information B. As such, tracking system 20 obtains information from both the commodity information B and second carrier shipment notification and, like in the first embodiment, associates these two sources of information to generate one supply shipment report containing both the supplier information relating to the supplier goods and the carrier information relating to carrier 215. From this, an ETA to manufacturer 16 from intermediate location 28 can be determined.

With continued reference to FIG. 2, the operation of the second embodiment of the present embodiment will now be described. As in the first embodiment, supplier 12 in the second embodiment issues commodity information A to tracking system 20 which contains characteristics of the supplier goods to be delivered to manufacturer 16. Likewise, carrier 114 provides a carrier shipment notification to tracking system 20, via first carrier link 124, which includes specific characteristics of the carrier such as departure date and time from supplier 12. Tracking system 20 then associates the carrier shipment notification and commodity information A to generate a supply shipment report. Tracking system 20 then retrieves stored information from route plan system 36 containing an estimate of the arrival time of the supplier goods to manufacturer 16 when the shipment is adhering to the schedule. The result is an ETA that is the most accurate and up-to-date ETA. This ETA is constantly updated with any new carrier shipment notifications which are issued during carrier's 114 route.

Once the supplier goods have passed through intermediate link 28 and have departed on carrier 215, carrier 215 issues a carrier shipment notification to tracking system 20. Tracking system 20 then updates the ETA using this new information. Because the new carrier shipment notification contains an estimated time for arrival to deliver the supplier goods to manufacturer 16, route plan system 36 is not needed to supply an estimate. Instead, that disclosed in the carrier shipment notification is relied upon and is most accurate. As a note, during all stages of shipment, tracking system 20 compares the ETA with the need time and generates alarms if so required.

One skilled in the art will appreciate that multiple intermediate locations, all positioned between a supplier and manufacturer, can be used with the present invention without deviating from the teachings contained herein.

With respect to manufacturer inbound 116, manufacturer outbound 216 and carrier 314, these elements operate as discussed in the first embodiment of the present invention. As such, tracking system 20 estimates an arrival time of material being shipped from manufacturing inbound 116 to manufacturing outbound 216. One skilled in the art will readily appreciate that manufacturer inbound 116 can be treated as supplier 12 and manufacturer outbound 216 can be treated the same as manufacturer 16 as described in the first embodiment of the present invention. Likewise, with respect to manufacturer outbound 216, final destination 34 and carrier 414, an ETA can be determined for finished goods being delivered to final destination 34 from manufacturer outbound 216. Moreover, one skilled in the art will appreciate that various intermediate locations, such as intermediate location 28, can be positioned between each of these elements without deviating from the teachings presented herein.

Figure 3:
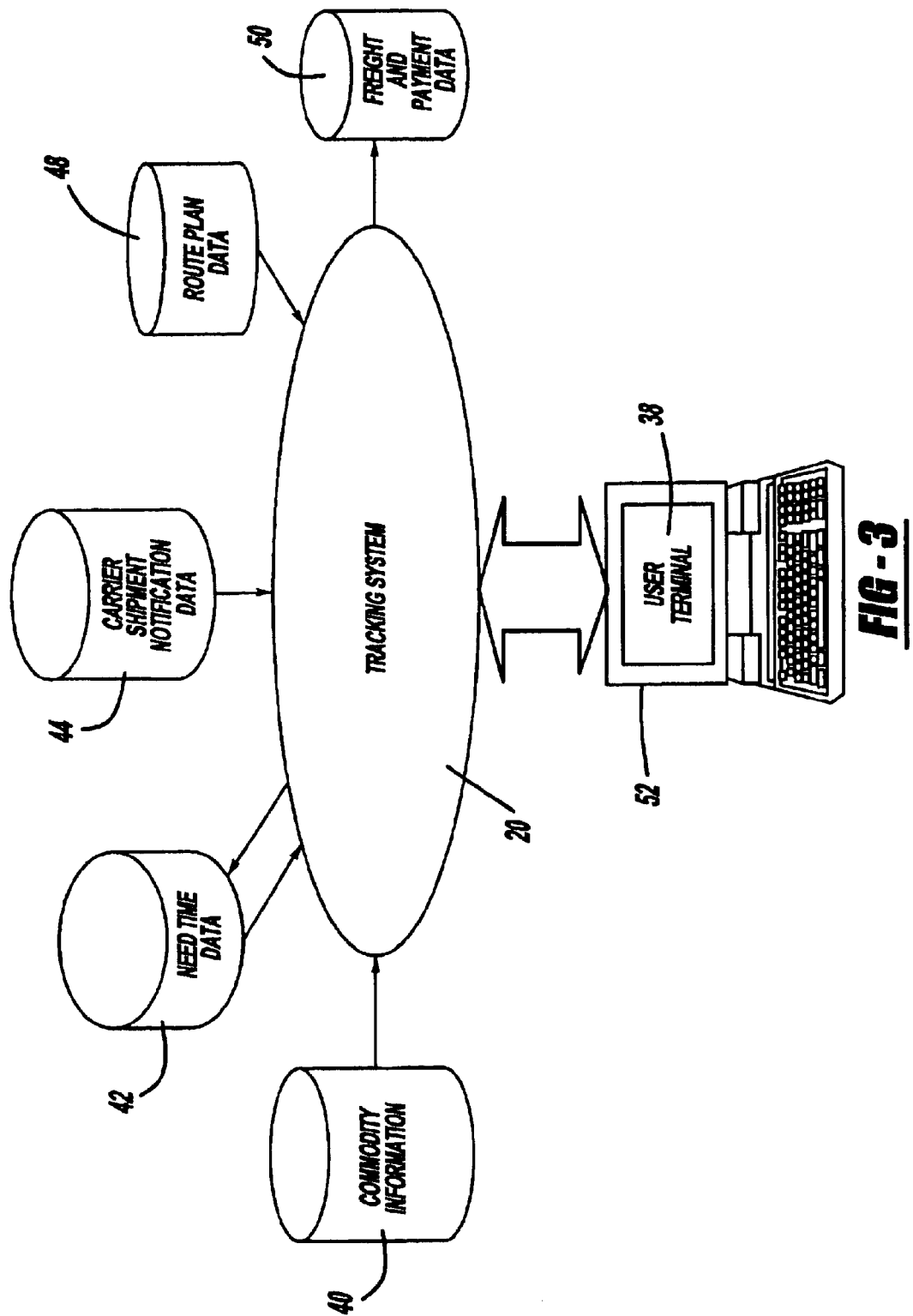
FIG. 3 is a schematic view of the interfacing of a material tracking system according to the present invention.

Referring now to FIG. 3, the operation of tracking system 20 will be described in greater detail. Tracking system 20 is a data processing system having a processor for processing data and a storage device for storing data. Tracking system 20 communicates preferably either through a network, via modem or internet, to user terminal 38. Terminal 38 could be a terminal, pager, phone, overhead display or other device. Tracking system 20 also interfaces with information links 40, 42, 44, 48, and 50 to acquire specific information for its calculations. These interfaces can be, again, via modem network or through the internet. More specifically, information link 40 provides specific information from suppliers 12, intermediate location 28, and final destination 34. This information, like before, can be in the form of commodity information. Information link 42 provides required need time for shipment calculations and receives ETA information from tracking system 20. Information link 44 provides information, such as that contained in the carrier shipment notification, which supplies information from first carrier 114, second carrier 215, third carrier 314, and fourth carrier 414. Information link 48 provides the conduit for information from route plan 36. Lastly, information link 50 provides information for freight and payment.

Screen 38 of user terminal 52 is designed to present an output which combines all the information provided by information links 40, 42, 44, 48, and 50 (otherwise known as the supply shipment report) as well as ETA and alarm codes. More specifically, output screen 52 shows for each specific part number of the supplier goods ordered, all the corresponding supplier information provided by the commodity information A and the associated carrier information provided by the carrier shipment notification form and, if applicable, all the information provided by the commodity information B. From this information, an estimated time for arrival to a designated destination is determined and also displayed. Moreover, as discussed previously, any alarm codes based on the ETA being later than the need time are also displayed. All times and dates contained in the supply shipment report can be converted to any time zone required. As such, if a user in one time zone was interested in a shipment departing a supplier in another time zone, the user could have all times and dates (i.e. need time, departure time, and ETA) converted to the desired time zone.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. In a data processing system for tracking inventory, said data processing system having a processor for processing data and a storage device for storing data, a method for estimating a time of arrival of supplier goods being transferred from a source to a final destination, wherein said supplier goods are transferred to an intermediate location by a first carrier and from said intermediate location to a final destination by a second carrier, said method comprising the steps of:

receiving at the data processing system a first transmission from said source, said transmission indicative of characteristics of said supplier goods;

receiving at the data processing system a second transmission from said first carrier when said first-carrier is delivering said supplier goods from said source to said intermediate location, said second transmission indicative of characteristics of said first carrier;

associating, with the data processing system, said first carrier with said supplier goods by comparing at least one of said characteristics of said supplier goods contained in said first transmission with at least one of said characteristics of said carrier contained in said second transmission;

obtaining a first estimated time of arrival for said supplier goods to said final destination, said first estimated time of arrival being obtained from said second transmission;

receiving at the data processing system a third transmission when said second carrier is delivering said supplier goods from said intermediate location to said final destination; said third transmission indicative of characteristics of said second carrier;

associating, with the data processing system, said second carrier with said supplier goods by comparing at least one of said characteristics of said supplier goods contained in said first transmission with at least one of said characteristics of said second carrier contained in said third transmission; and determining, with the data processing system, a second estimated time of arrival from a route plan and the third transmission, said second estimated time of arrival being an updated estimated time of arrival of said supplier goods to said final destination.

2. The method as claimed in claim 1, wherein said source is a manufacturer and said final destination is a sales location.

3. The method as claimed in claim 1, wherein said source is a producer of raw material and said final destination is a manufacturer.

4. In a data processing system for tracking supplier goods, said data processing system having a processor for processing data and a storage device for storing data, a method for updating an estimated time of arrival of the supplier goods being transferred from a source to a final destination via one or more intermediate destinations, the method comprising the steps of:

receiving at the data processing system a commodity information message from the source, the commodity information indicative of characteristics of the supplier goods;

receiving at the data processing system a carrier shipment notification message from each of the one or more intermediate destinations whenever an associated carrier has picked up goods for departure, the notification message indicative of characteristics of the associated carrier;

storing all received commodity information messages and carrier shipment notifications in a database; and updating at the data processing system an estimated time of arrival of the supplier goods at a final destination by associating a current carrier with the commodity information for the goods by comparing at least one characteristic of the goods with at least one characteristic of the associated carrier in the database.

5. The method of claim 4 further comprising the steps of:

comparing at the data processing system the updated established time of arrival with a need time; and initiating an alarm if the updated estimated time of arrival is later than the need time.

6. The method of claim 4 wherein the characteristics of the goods include commodity, quantity, pick-up location, destination and package number.

7. The method of claim 4 therein the characteristics of each carrier include conveyance number, pick-up location, carrier destination, standard carrier alpha code, and carrier date and time of shipment.

* * * * *